United States Patent
Kwon et al.

(10) Patent No.: US 12,027,724 B2
(45) Date of Patent: Jul. 2, 2024

(54) METHOD FOR MANUFACTURING SEPARATOR FOR ELECTROCHEMICAL DEVICE

(71) Applicant: LG CHEM, LTD., Seoul (KR)

(72) Inventors: Hye-Jin Kwon, Daejeon (KR); Su-Jin Yoon, Daejeon (KR); Myeong-Soo Kim, Daejeon (KR); Je-An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 798 days.

(21) Appl. No.: 17/251,530

(22) PCT Filed: Feb. 21, 2020

(86) PCT No.: PCT/KR2020/002570
§ 371 (c)(1),
(2) Date: Dec. 11, 2020

(87) PCT Pub. No.: WO2020/197102
PCT Pub. Date: Oct. 1, 2020

(65) Prior Publication Data
US 2021/0249734 A1 Aug. 12, 2021

(30) Foreign Application Priority Data
Mar. 25, 2019 (KR) .................. 10-2019-0033748

(51) Int. Cl.
| | |
|---|---|
| *H01M 50/403* | (2021.01) |
| *H01M 50/409* | (2021.01) |
| *H01M 50/426* | (2021.01) |
| *H01M 50/446* | (2021.01) |
| *H01M 50/449* | (2021.01) |
| *H01M 10/0525* | (2010.01) |
| *H01M 50/443* | (2021.01) |

(52) U.S. Cl.
CPC ....... *H01M 50/403* (2021.01); *H01M 50/409* (2021.01); *H01M 50/426* (2021.01); *H01M 50/446* (2021.01); *H01M 50/449* (2021.01); *H01M 10/0525* (2013.01); *H01M 50/443* (2021.01)

(58) Field of Classification Search
None
See application file for complete search history.

(56) References Cited

U.S. PATENT DOCUMENTS

| | | | |
|---|---|---|---|
| 2004/0166407 A1* | 8/2004 | Nakajima | H01M 50/434 429/232 |
| 2009/0111026 A1 | 4/2009 | Kim et al. | |
| 2009/0305141 A1 | 12/2009 | Lee et al. | |
| 2011/0045338 A1 | 2/2011 | Bae et al. | |
| 2011/0259505 A1 | 10/2011 | Lee et al. | |
| 2012/0115036 A1 | 5/2012 | Lee et al. | |
| 2013/0280583 A1 | 10/2013 | Lee et al. | |
| 2014/0023921 A1 | 1/2014 | Lee et al. | |
| 2014/0295285 A1 | 10/2014 | Lee et al. | |
| 2017/0338461 A1 | 11/2017 | Seo et al. | |
| 2018/0034025 A1* | 2/2018 | Lee | H01M 50/457 |
| 2019/0173069 A1 | 6/2019 | Kwon et al. | |

FOREIGN PATENT DOCUMENTS

| | | |
|---|---|---|
| CN | 101401232 A | 4/2009 |
| CN | 101960659 A | 1/2011 |
| CN | 102770984 A | 11/2012 |
| CN | 103814460 A | 5/2014 |
| CN | 103828092 A | 5/2014 |
| JP | 2016-15268 A | 1/2016 |
| KR | 10-0727248 B1 | 6/2007 |
| KR | 10-2011-0035847 A | 4/2011 |
| KR | 10-2012-0127059 A | 11/2012 |
| KR | 10-2013-0045601 A | 5/2013 |
| KR | 20140026009 A * | 3/2014 |
| KR | 10-2014-0060796 A | 5/2014 |
| KR | 10-2016-0129762 A | 11/2016 |
| KR | 10-1689752 B1 | 1/2017 |
| KR | 10-2017-0129641 A | 11/2017 |
| KR | 10-2018-0088280 A | 8/2018 |
| KR | 10-2018-0110375 A | 10/2018 |
| WO | WO 2018/003373 A1 | 1/2018 |

OTHER PUBLICATIONS

International Search Report (PCT/ISA/210) issued in PCT/KR2020/002570, dated Jun. 17, 2020.
European Patent Office Extended Search Report dated Nov. 18, 2021 for EP Application No. 20777371.4.

* cited by examiner

*Primary Examiner* — Michael P. Rodriguez
(74) *Attorney, Agent, or Firm* — Birch, Stewart, Kolasch & Birch, LLP

(57) ABSTRACT

A separator with improved heat resistance and low resistance as well as Lami Strength that is equal or similar to that of the existing separator by using a predetermined amount of polyvinylpyrrolidone binder polymer relative to a polyvinylidene fluoride-based binder polymer, and a manufacturing method thereof.

17 Claims, No Drawings

METHOD FOR MANUFACTURING SEPARATOR FOR ELECTROCHEMICAL DEVICE

TECHNICAL FIELD

The present disclosure relates to a method for manufacturing a separator used for an electrochemical device, for example, a lithium secondary battery.

The present application claims priority to Korean Patent Application No. 10-2019-0033748 filed in the Republic of Korea on Mar. 25, 2019, the disclosure of which is incorporated herein by reference.

BACKGROUND ART

Recently, there has been an increasing interest in energy storage technology day by day. As the application field of energy storage technology has been extended to mobile phones, camcorders, laptop computers, and even electric cars, many efforts have been devoted to studying and developing electrochemical devices. In this aspect, electrochemical devices are attracting more attention, and especially, development of rechargeable secondary batteries is the focus of attention, and more recently, in the development of batteries, new electrode and battery design for improving the capacity density and specific energy have been studied and developed.

In currently available secondary batteries, lithium secondary batteries developed in early 1990's have much higher operating voltage and energy density than traditional batteries using aqueous electrolyte solutions such as Ni-MH, Ni—Cd, lead-acid batteries, and by virtue of these advantages, lithium secondary batteries are gaining much attention. Electrochemical devices are produced by many manufacturers, and each shows different safety characteristics. Assessment and management of the safety of electrochemical devices is very grave. The most important consideration is that electrochemical devices should not cause injury to users in the event of malfunction, and for this purpose, Safety Regulations strictly prohibit fire and flame in electrochemical devices. In the safety characteristics of electrochemical devices, overheating and eventual thermal runaway in electrochemical devices or piercing of separators poses a high risk of explosion. Particularly, polyolefin-based porous polymer substrates commonly used for separators of electrochemical devices show extremely severe thermal contraction behaviors at the temperature of 100° C. or above due to their properties of materials and manufacturing processes including stretching, causing a short circuit between the positive electrode (cathode) and the negative electrode (anode).

To solve the safety problem of electrochemical devices, for example, lithium secondary batteries, suggestions have been made on a separator having a porous coating layer formed by coating a mixture of excess inorganic particles and a binder polymer on at least one surface of a porous polymer substrate having a plurality of pores.

To improve the Lami Strength of the porous coating layer, fluorine-based polymer, for example, polyvinylidene fluoride or its copolymer has been mainly used. However, due to having a low melting point of 130 to 150° C., the polyvinylidene fluoride-based binder polymer is incompetent to meet the safety requirement in the recent trend towards larger dimension and higher capacity of electrochemical devices.

Additionally, the use in separators for electrochemical devices requires the heat resistance, as well as the Lami Strength with the electrode that satisfies a predetermined value.

DISCLOSURE

Technical Problem

The present disclosure is directed to providing a method for manufacturing a separator with low resistance and improved heat resistance as well as Lami Strength with the electrode that is equal to or higher than that of the existing separator.

Technical Solution

An aspect of the present disclosure provides a method for manufacturing a separator according to the following embodiments.

A first embodiment relates to the method for manufacturing a separator for an electrochemical device comprising (S1) preparing a first binder composition containing a polyvinylpyrrolidone binder polymer dissolved in a first organic solvent, (S2) preparing a second binder composition containing a polyvinylidene fluoride-based binder polymer dissolved in a second organic solvent, (S3) preparing a porous coating layer slurry containing inorganic particles dispersed in a mixture of the first binder composition and the second binder composition, and (S4) coating the porous coating layer slurry on at least one surface of a porous polymer substrate and drying the porous coating layer slurry to form a porous coating layer on the at least one surface of the porous polymer substrate, wherein a weight (A) of the polyvinylpyrrolidone binder polymer and a weight (B) of the polyvinylidene fluoride-based binder polymer satisfy a ratio of A/B≤1, wherein the polyvinylidene fluoride-based binder polymer is not soluble in the first organic solvent, and a weight ratio of the first organic solvent to the second organic solvent is 5:95 to 30:70.

In the first embodiment, a second embodiment relates to the method for manufacturing a separator for an electrochemical device, wherein a boiling point of the first organic solvent is higher than a boiling point of the second organic solvent.

In the first or second embodiment, a third embodiment relates to the method for manufacturing a separator for an electrochemical device, wherein a boiling point of the first organic solvent is 60° C. to 100° C.

In any one of the first to third embodiments, a fourth embodiment relates to the method for manufacturing a separator for an electrochemical device, wherein the first organic solvent includes at least one of alcohol, water or a combination thereof.

In the fourth embodiment, a fifth embodiment relates to the method for manufacturing a separator for an electrochemical device, wherein the alcohol includes at least one of ethanol, n-propanol, isopropanol, n-butanol, sec-butanol, isobutanol, tert-butanol or a combination thereof.

In any one of the first to fifth embodiments, a sixth embodiment relates to the method for manufacturing a separator for an electrochemical device, wherein the second organic solvent includes at least one of acetone, tetrahydrofuran, methylenechloride, chloroform, methylethylketone or a combination thereof.

In any one of the first to sixth embodiments, a seventh embodiment relates to the method for manufacturing a separator for an electrochemical device, wherein the weight (A) of the polyvinylpyrrolidone binder polymer and the weight (B) of the polyvinylidene fluoride-based binder polymer satisfy the ratio of 0.1≤A/B≤1.

In any one of the first to seventh embodiments, an eighth embodiment relates to the method for manufacturing a separator for an electrochemical device, wherein the weight ratio of the first organic solvent to the second organic solvent is 8:92 to 18:82.

In any one of the first to eighth embodiments, a ninth embodiment relates to the method for manufacturing a separator for an electrochemical device, wherein a weight ratio of the inorganic particles to a total amount of the binder polymer is 85:15 to 50:50.

In any one of the first to ninth embodiments, a tenth embodiment relates to the method for manufacturing a separator for an electrochemical device, wherein the polyvinylidene fluoride-based binder polymer includes at least one of polyvinylidene fluoride, polyvinylidene fluoride-co-hexafluoropropylene, polyvinylidene fluoride-co-trifluoroethylene, polyvinylidene fluoride-co-chlorotrifluoroethylene, polyvinylidene fluoride-co-tetrafluoroethylene, or a combination thereof.

In any one of the first to tenth embodiments, an eleventh embodiment relates to the method for manufacturing a separator for an electrochemical device, wherein the drying is performed in a relative humidity condition of 35% to 65%.

In any one of the first to eleventh embodiments, a twelfth embodiment relates to the method for manufacturing a separator for an electrochemical device, wherein a weight average molecular weight of the polyvinylpyrrolidone binder polymer is 675,000 to 3,500,000.

In any one of the first to twelfth embodiments, a thirteenth embodiment relates to the method for manufacturing a separator for an electrochemical device, wherein the first binder composition or the second binder composition further comprises a dispersant.

In the thirteenth embodiment, a fourteenth embodiment relates to the method for manufacturing a separator for an electrochemical device, wherein the dispersant includes at least one of cyanoethylpolyvinylalcohol, polyvinyl butyral, polyvinyl alcohol, polyvinyl acetate, polyethylene oxide, polyarylate, cellulose acetate, cellulose acetate butyrate, cellulose acetate propionate, cyanoethylpullulan, cyanoethylcellulose, cyanoethylsucrose, pullulan, carboxyl methyl cellulose, or a combination thereof.

In any one of the first to fourteenth embodiments, a fifteenth embodiment relates to the method for manufacturing a separator for an electrochemical device according to first embodiment, wherein a boiling point of the first organic solvent is higher by 20° C. to 45° C. than a boiling point of the second organic solvent.

Advantageous Effects

According to an embodiment of the present disclosure, it is possible to provide a separator with improved heat resistance and low resistance as well as Lami Strength that is equal or similar to that of the existing separator by using a predetermined amount of polyvinylpyrrolidone binder polymer relative to a polyvinylidene fluoride-based binder polymer, and a manufacturing method thereof.

According to an embodiment of the present disclosure, it is possible to provide a separator with improved heat resistance and low resistance as well as Lami Strength that is equal or similar to that of the existing separator by controlling the solvent and the nonsolvent used to manufacture the separator, and a manufacturing method thereof.

BEST MODE

Hereinafter, the present disclosure will be described in detail. It should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

It will be further understood that when an element is referred to as being [connected to] another element, it can be [directly connected to] the other element or intervening elements may be present. Additionally, the connection covers physical connection as well as electrochemical connection.

The term [comprises] when used in this specification, specifies the presence of stated elements, but does not preclude the presence or addition of one or more other elements, unless the context clearly indicates otherwise.

Additionally, [comprise] and/or [comprising] when used in this specification, specifies the presence of stated features, integers, steps, operations, elements, components and/or groups thereof, but does not preclude the presence or addition of one or more other features, integers, operations, elements, components, and/or groups thereof.

It will be understood that [about] and [substantially] are used herein in the sense of at, or nearly at, when given the manufacturing and material tolerances inherent in the stated circumstances and are used to prevent the unscrupulous infringer from unfairly taking advantage of the disclosure where exact or absolute figures are stated as an aid to understanding the present disclosure.

It will be further understood that [combination(s) thereof] in Markush type language as used herein, refers to a mixture or combination of one or more selected from the group consisting of elements stated in Markush type language, and specifies the inclusion of one or more selected from the group consisting of the elements. [A and/or B] when used in this specification, specifies [either A or B or both].

In a separator having a porous coating layer, to improve the Lami Strength of the porous coating layer, the use of a polyvinylidene fluoride-based binder polymer alone results in low safety due to the low melting point of the polyvinylidene fluoride-based binder polymer.

Accordingly, there is a demand for separators with higher heat resistance than those using a polyvinylidene fluoride-based binder polymer and an equal or improved Lami Strength with the electrode. Additionally, there is a demand for separators with low resistance.

To meet the demand, the inventors aim at providing a separator with improved Lami Strength between the separator and the electrode, improved heat resistance and reduced resistance in which a polyvinylpyrrolidone (PVP) binder polymer and a polyvinylidene fluoride-based binder polymer are used together, the weight of the polyvinylpyrrolidone binder polymer is equal to or less than the weight of the polyvinylidene fluoride-based binder polymer, and wet phase separation is induced by controlling the used organic solvent.

Accordingly, a method for manufacturing a separator for an electrochemical device according to an aspect of the present disclosure includes:

(S1) preparing a first binder composition containing a polyvinylpyrrolidone binder polymer dissolved in a first organic solvent;

(S2) preparing a second binder composition containing a polyvinylidene fluoride-based binder polymer dissolved in a second organic solvent;

(S3) preparing a porous coating layer slurry containing inorganic particles dispersed in a mixture of the first binder composition and the second binder composition; and (S4) coating the porous coating layer slurry on at least one surface of a porous polymer substrate and drying to form a porous coating layer, wherein the weight (A) of the polyvinylpyrrolidone binder polymer and the weight (B) of the polyvinylidene fluoride-based binder polymer satisfy A/B≤1, the first organic solvent is a nonsolvent for the polyvinylidene fluoride-based binder polymer, and a weight ratio of the first organic solvent and the second organic solvent is 5:95 to 30:70.

Hereinafter, the method for manufacturing a separator for an electrochemical device according to an aspect of the present disclosure will be described in detail.

First, the first binder composition containing the polyvinypyrrolidone binder polymer dissolved in the first organic solvent is prepared (S1).

The first binder composition contains the polyvinylpyrrolidone binder polymer dissolved in the first organic solvent.

The first organic solvent is a good solvent for the polyvinylpyrrolidone binder polymer, and a nonsolvent for the polyvinylidene fluoride-based binder polymer described below. The first organic solvent acts as a nonsolvent for the polyvinylidene fluoride-based binder polymer to provide a separator in which the polyvinylidene fluoride-based binder polymer is mainly located on the surface of the porous coating layer.

In the present disclosure, the 'good solvent' is capable of dissolving 10 wt % or more of the polyvinylidene fluoride-based binder polymer in the condition of 25° C.

In the present disclosure, the 'nonsolvent' is capable of dissolving less than 5 wt % of the polyvinylidene fluoride-based binder polymer in the condition of 25° C.

In a particular embodiment of the present disclosure, the boiling point of the first organic solvent is higher than the boiling point of the second organic solvent. In this case, a separator may be provided in which the polyvinylidene fluoride-based binder polymer is mainly located on the surface of the porous coating layer. In a particular embodiment of the present disclosure, the boiling point of the first organic solvent may be 60 to 100° C., or 65 to 95° C. Within the above range, it is possible to prevent thermal contraction of the porous polymer substrate when the first organic solvent is dried, and provide a separator in which the polyvinylidene fluoride-based binder polymer is mainly located on the surface of the porous coating layer.

The polyvinylidene fluoride-based binder polymer has a higher adhesive strength than the polyvinylpyrrolidone binder polymer, thereby improving the adhesion between the electrode and the separator.

The first organic solvent promotes the phase separation of the polyvinylidene fluoride-based binder polymer so that a larger amount of the polyvinylidene fluoride-based binder polymer is located on the surface of the porous coating layer. Accordingly, the bond strength of the separator to the electrode increases, which makes lamination easy.

In a particular embodiment of the present disclosure, the first organic solvent may include alcohol, water or a combination thereof.

In particular, alcohol is desirable since it acts as a weak nonsolvent for the polyvinylidene fluoride-based binder polymer to solidify the polyvinylidene fluoride-based binder polymer in the step of drying the organic solvent.

In a particular embodiment of the present disclosure, the alcohol may include ethanol, n-propanol, isopropanol, n-butanol, sec-butanol, isobutanol, tert-butanol or a combination thereof.

The polyvinylpyrrolidone binder polymer used includes a repeating unit represented by the following chemical formula 1.

[Chemical Formula 1]

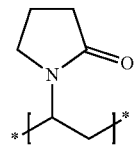

The polyvinylpyrrolidone binder polymer has the glass transition temperature Tg of 150 to 180° C. and high heat resistance. The polyvinylpyrrolidone binder polymer has a lactam ring structure, and thus is chemically stable. Additionally, due to the high polarity of the carbonyl group (C=O), the polyvinylpyrrolidone binder polymer is suitable as the binder polymer of the porous coating layer in terms of improved dispersion and mobility of the porous coating layer slurry.

In a particular embodiment of the present disclosure, the weight average molecular weight of the polyvinylpyrrolidone binder polymer may be 675,000 to 3,500,000. Within the above-describe range, it is possible to prevent the reduced heat resistance of the separator and increased thermal shrinkage due to the low weight average molecular weight of the polyvinylpyrrolidone binder polymer, and prevent the problem that it is impossible to prepare the porous coating layer slurry and perform the coating process due to a very high weight average molecular weight of the polyvinylpyrrolidone binder polymer and its consequential high viscosity.

In a particular embodiment of the present disclosure, the weight average molecular weight of the polyvinylpyrrolidone binder polymer may be 675,000 or more, or 800,000 or more, or 900,000 or more, or 950,000 or more, or 1,000,000 or more within the above-described range, and the weight average molecular weight of the polyvinylpyrrolidone binder polymer may be 3,500,000 or less, or 3,000,000 or less, or 2,500,000 or less within the above-described range. For example, the weight average molecular weight may be 950,000 to 2,500,000 in terms of enhanced heat resistance and adhesion and high process performance.

In this instance, the weight average molecular weight may be measured using gel permeation chromatography (GPC) (PL GPC220, Agilent Technologies).

In detail, the measurement may be performed under the following analysis conditions:

Column: PL MiniMixed B×2
Solvent: THE
Flow rate: 0.3 ml/min
Specimen concentration: 2.0 mg/ml
Injection amount: 10 μl
Column temperature: 40° C.

Detector: Agilent RI detector

Standard: Polystyrene (fitted to a third degree polynominal)

Data processing: ChemStation

The polyvinylpyrrolidone binder polymer according to the present disclosure is a non-crosslinked binder polymer.

The polyvinylpyrrolidone binder polymer is structurally free of reactive groups that cause crosslinking reactions, and in particular, the method for manufacturing a separator according to an aspect of the present disclosure does not include an initiator and a curing agent, and there is no crosslinking reaction. In more detail, the polyvinylpyrrolidone binder polymer may have hydrogen bonding due to the high polarity of the carbonyl group (C=O), but chemical bonding cannot occur without an initiator and a curing agent.

The weight A of the polyvinylpyrrolidone binder polymer is equal to or less than the weight B of the polyvinylidene fluoride-based binder polymer. When the polyvinylpyrrolidone binder polymer is not included, the resistance value is high, and it is impossible to provide a separator with low resistance according to the present disclosure.

When a ratio A/B of the weight A of the polyvinylpyrrolidone binder polymer to the weight B of the polyvinylidene fluoride-based binder polymer is higher than 1, i.e., when the weight A of the polyvinylpyrrolidone binder polymer is higher than the weight B of the polyvinylidene fluoride-based binder polymer, the resistance value is high and the Lami Strength with the electrode is low, and thus it is impossible to use as a separator for an electrochemical device.

In a particular embodiment of the present disclosure, the ratio A/B between the weight A of the polyvinylpyrrolidone binder polymer and the weight B of the polyvinylidene fluoride-based binder polymer may be 0.01 or more or, 0.1 or more, or 0.15 or more within the above-described range, and the ratio A/B between the weight A of the polyvinylpyrrolidone binder polymer and the weight B of the polyvinylidene fluoride-based binder polymer may be 1 or less, or 0.8 or less, or 0.7 or less, or 0.5 or less, or 0.35 or less within the above-described range.

It is possible to achieve the object of the present disclosure more effectively within the above-described range. That is, it is possible to provide an improved separator with reduced air permeability, low resistance, good Lami Strength with the electrode and low thermal shrinkage. In detail, the weight (A) of the polyvinylpyrrolidone binder polymer and the weight (B) of the polyvinylidene fluoride-based binder polymer may satisfy $0.1 \leq A/B \leq 1$.

For example, when the weight A of the polyvinylpyrrolidone binder polymer and the weight B of the polyvinylidene fluoride-based binder polymer satisfy $0.15 \leq A/B \leq 0.35$, it is possible to provide an improved separator with reduced air permeability, low resistance, good Lami Strength with the electrode and low thermal shrinkage.

In a particular embodiment of the present disclosure, a k-value of the polyvinylpyrrolidone binder polymer may be 90 to 120. It is possible to achieve the object of the present disclosure more effectively within the above-described range. The k-value of the polyvinylpyrrolidone binder polymer may be 90 or more within the above-described range, and may be 120 or less within the above-described range. For example, when the k-value is in the range of 90 to 120, it is desirable in terms of high heat resistance and good Lami Strength.

The term 'k-value' as used herein is a value about intrinsic viscosity of thermoplastic resin, and is also known as Fikentscher's K-value. The K-value may be measured in accordance with DIN EN ISO 1628-1.

Subsequently, the second binder composition containing the polyvinylidene fluoride-based binder polymer dissolved in the second organic solvent is prepared (S2).

The step (S1) may be performed earlier than the step (S2). The step (S2) may be performed earlier than the step (S1). Additionally, the step (S1) and the step (S2) may be performed at the same time.

The second binder composition contains the polyvinylidene fluoride-based binder polymer dissolved in the second organic solvent.

The second organic solvent is a good solvent for the polyvinylidene fluoride-based binder polymer and a dispersant.

The second organic solvent may be capable of dissolving 10 wt % or more of each of the polyvinylidene fluoride-based binder polymer and the dispersant in the condition of 25° C.

In a particular embodiment of the present disclosure, the boiling point of the second organic solvent may be 40 to 80° C.

In a particular embodiment of the present disclosure, the boiling point of the first organic solvent may be higher by 20 to 45° C. than that of the second organic solvent.

In this case, a separator may be provided in which the polyvinylidene fluoride-based binder polymer is mainly located on the surface of the porous coating layer. The polyvinylidene fluoride-based binder polymer has a higher adhesive strength than the polyvinylpyrrolidone binder polymer, thereby improving the adhesion between the electrode and the separator.

In a particular embodiment of the present disclosure, the second organic solvent may include acetone, tetrahydrofuran, methylenechloride, chloroform, methylethylketone, or a combination thereof.

In particular, acetone is desirable since it has a low boiling point and is advantageous for pore formation in the porous coating layer.

In the present disclosure, a weight ratio of the first organic solvent and the second organic solvent is 5:95 to 30:70. When the weight percent of the first organic solvent is less than 5 weight %, the viscosity of the polyvinylpyrrolidone binder polymer in the first binder composition is high and miscibility of the first binder composition and the second binder composition reduces, and as a consequence, dispersion of the porous coating layer slurry reduces, which makes it impossible to form the porous coating layer. When the weight percent of the first organic solvent exceeds 30 weight %, it is difficult for the polyvinylidene fluoride-based binder polymer to move from the inner part of the porous coating layer to the surface during formation of the porous coating layer. That is, the polyvinylidene fluoride-based binder polymer is located in the inner part of the porous coating layer close to the porous polymer substrate, resulting in significantly reduced adhesion with the electrode.

In a particular embodiment of the present disclosure, the weight ratio of the first organic solvent and the second organic solvent is 5:95 to 30:70, or 10:90 to 27:73, or 10:90 to 24:76, or 8:92 to 18:82 within the above-described range.

In particular, the weight ratio of 10:90 to 24:76 is desirable for improved dispersion of the slurry for the porous coating layer and increased adhesion between the separator and the electrode.

The polyvinylidene fluoride-based binder polymer has adhesive properties, and provides the bond strength between the porous polymer substrate and the porous coating layer or between the porous coating layer and the electrode. Additionally, the polyvinylidene fluoride-based binder polymer serves to bind the inorganic particles in the porous coating layer to prevent the separation of the inorganic particles.

In a particular embodiment of the present disclosure, the polyvinylidene fluoride-based binder polymer may include polyvinylidene fluoride, polyvinylidene fluoride-co-hexafluoropropylene, polyvinylidene fluoride-co-trifluoroethylene, polyvinylidene fluoride-co-chlorotrifluoroethylene, polyvinylidene fluoride-co-tetrafluoroethylene, or a combination thereof.

The first binder composition or the second binder composition may include a dispersant.

The dispersant is used to disperse the inorganic particles to prevent the agglomeration of solids when forming the porous coating layer. Accordingly, the dispersant may be added to the first binder composition or the second binder composition.

Additionally, the dispersant may be added together with the inorganic particles.

However, to disperse the inorganic particles, the dispersant may be added in the step (S1) or (S2) before adding the inorganic particles.

In a particular embodiment of the present disclosure, the dispersant may include cyanoethylpolyvinylalcohol, polyvinyl butyral, polyvinyl alcohol, polyvinyl acetate, polyethylene oxide, polyarylate, cellulose acetate, cellulose acetate butyrate, cellulose acetate propionate, cyanoethylpullulan, cyanoethylcellulose, cyanoethylsucrose, pullulan, carboxyl methyl cellulose or a combination thereof.

The dispersant may be present in an amount of 0.1 to 10 parts by weight, or 0.5 to 7.5 parts by weight based on 100 parts by weight of the inorganic particles, the binder polymer and the dispersant.

Subsequently, the inorganic particles are added to the mixture of the first binder composition and the second binder composition to prepare the porous coating layer slurry containing the inorganic particles dispersed in the mixture (S3).

In the present disclosure, the inorganic particles are not limited to a particular type if they are electrochemically stable. That is, the inorganic particles that may be used in the present disclosure are not limited to a particular type if they do not cause oxidation and/or reduction reactions in the operating voltage range (for example, 0-5V versus Li/Li+) of the electrochemical device used. In particular, the use of inorganic particles of high dielectric constants as the inorganic particles contributes to the increased degree of dissociation of an electrolyte salt, for example, a lithium salt, in a liquid electrolyte, thereby improving the ionic conductivity of an electrolyte solution.

By the above-described reasons, the inorganic particles may include inorganic particles having the dielectric constant of 5 or more, inorganic particles capable of transporting lithium ions and a combination thereof.

The inorganic particles having the dielectric constant of 5 or more may include at least one selected from the group consisting of $Al_2O_3$, $SiO_2$, $ZrO_2$, $AlO(OH)$, $TiO_2$, $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_{3-x}PbTiO_3$ (PMN-PT, $0<x<1$), hafnia ($HfO_2$), $SrTiO_3$, $SnO_2$, $CeO_2$, $MgO$, $NiO$, $CaO$, $ZnO$ and $SiC$.

The inorganic particles capable of transporting lithium ions may include at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$) and $P_2S_5$-based glass ($Li_xP_yS_z$, $0<x<3$, $0<y<3$, $0<z<7$).

Additionally, the average particle size of the inorganic particles is not particularly limited, but for the coating layer of a uniform thickness and appropriate porosity, the average particle size preferably ranges between 0.001 and 10 μm. When the average particle size is smaller than 0.001 μm, dispersion may be reduced, and when the average particle size is larger than 10 μm, the thickness of the coating layer may increase.

The inorganic particles pulverized to a predetermined diameter may be added, or the inorganic particles may be added to the first binder composition, and then pulverized and dispersed while controlling the diameter so that the inorganic particles have a predetermined diameter using a ball milling method.

A weight ratio of the inorganic particles and the total amount of the binder polymer (the polyvinylidene fluoride-based binder polymer and the polyvinylpyrrolidone binder polymer) may be 85:15 to 50:50. When the weight ratio of the inorganic particles to the total amount of the binder polymer satisfies the above range, it is possible to prevent reductions in the pore size and the porosity of the porous coating layer due to the high amount of the binder polymer, and reduction in the peel resistance of the coating layer due to the low amount of the binder polymer.

In this instance, the second binder composition may be mixed with the first binder composition, and then the inorganic particles may be dispersed. Alternatively, the first binder composition may be mixed with the second binder composition, and then the inorganic particles may be added. Alternatively, the first binder composition and the second binder composition may be mixed together, and then the inorganic particles may be added. Alternatively, the inorganic particles may be put, and then the mixture of the first binder composition and the second binder composition may be added.

Common methods known in the art may be used to disperse the inorganic particles, for example, methods using an ultrasonic disperser, a ball mill, a bead mill, a disperser and a mixer, in particular, a ball milling method or a bead milling method is desirable. In this instance, the treatment time may vary depending on the capacity, but 1 to 20 hours is proper, and the particle size distribution of the pulverized inorganic particles may be controlled according to the bead size used in the ball mill or the bead mill and the ball milling (or bead milling) time.

Subsequently, the porous coating layer slurry is coated on at least one surface of the porous polymer substrate and dried to form the porous coating layer (S4).

In a particular embodiment of the present disclosure, the porous coating layer may be formed on one or two surfaces of the porous polymer substrate.

In the present disclosure, the porous polymer substrate is a porous film, and may include, without limitation, any type that may be commonly used for separator materials of electrochemical devices to provide channels along which lithium ions move while preventing a short circuit by electrically separating the negative electrode (anode) and the positive electrode (cathode).

In detail, the porous polymer substrate may be a porous polymer film substrate or a porous polymer nonwoven substrate.

The porous polymer film substrate may be a porous polymer film of polyolefin such as polyethylene, polypropylene, polybutene and polypentene, and the polyolefin porous polymer film substrate exhibits a shutdown function, for example, at the temperature of 80° C. to 130° C.

In this instance, the polyolefin porous polymer film substrate may be made of polyolefin-based polymer including polyethylene such as high density polyethylene, linear low density polyethylene, low density polyethylene and ultra high molecular weight polyethylene, polypropylene, polybutylene and polypentene, used singly or in combination.

Additionally, the porous polymer film substrate may be formed in the shape of a film using various types of polymers such as the above-described polyolefin as well as polyester. Additionally, the porous polymer film substrate may be formed by stacking two or more film layers, and each film layer may be formed from polymer such as polyolefin and polyester as described above, used singly or in combination.

Additionally, in addition to the polyolefin-based polymer, the porous polymer film substrate and the porous nonwoven substrate may be formed from at least one of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalene.

The thickness of the porous polymer substrate is not particularly limited, but the thickness is particularly 1 to 100 μm, more particularly 5 to 50 μm, and with the recent movement towards higher output/higher capacity of batteries, using the porous polymer substrate of a thin film is advantageous. The pore diameter of the porous polymer substrate may be 10 nm to 100 nm, or 10 nm to 70 nm, or 10 nm to 50 nm, or 10 nm to 35 nm, and the porosity may be 5% to 90%, preferably 20% to 80%. However, in the present disclosure, these ranges may be subject to change depending on specific embodiments or necessity.

The pores of the porous polymer substrate have many types of pore structures, and it falls within the present disclosure when any of the average pore size measured using a porosimeter and the average pore size observed on FE-SEM satisfies the above condition.

Here, a commonly known uniaxially-oriented dry separator is on the basis of the pore size at the center in the TD direction, not in the MD direction, on FE-SEM, and a porous polymer substrate of mesh structure (for example, a wet PE separator) is on the basis of the pore size measured using a porosimeter.

The thickness of the porous coating layer is not particularly limited, but the thickness is particularly 1 to 10 μm, more particularly 1.5 to 6 μm, and likewise, the porosity of the porous coating layer is not particularly limited, but the porosity is preferably 35 to 65%.

In addition to the inorganic particles and the binder polymer as the porous coating layer component, the separator according to an aspect of the present disclosure may further include an additive.

The method for coating the porous coating layer slurry on the porous polymer substrate is not limited to a particular type, but a slot coating method or a dip coating method is desirable. The slot coating involves coating a composition supplied through a slot die onto the front surface of the substrate, and may control the thickness of the coating layer according to the flow rate supplied from a constant volume pump. Additionally, the dip coating is a coating method including dipping the substrate in a tank containing a composition and may control the thickness of the coting layer according to the concentration of the composition and the speed at which the substrate is taken out of the composition tank, and for more accurate control of the coating thickness, after dipping, measurement may be performed through a Meyer bar.

The porous polymer substrate coated with the porous coating layer slurry is dried using a dryer such as an oven to form the porous coating layer on at least one surface of the porous polymer substrate.

In the porous coating layer, the inorganic particles and the binder polymer (the polyvinylidene fluoride-based binder polymer and the polyvinylpyrrolidone binder polymer) are packed in contact such that the inorganic particles are bonded by the binder polymer, forming interstitial volumes therebetween, and the interstitial volumes are empty spaces that are to be pores.

That is, the binder polymer may bind the inorganic particles to hold them together, and for example, the polyvinylpyrrolidone binder polymer or the polyvinylidene fluoride-based binder polymer may adhere and immobilize the inorganic particles. Additionally, interstitial volumes between the inorganic particles are empty spaces that are to be the pores of the porous coating layer, and may be spaces defined by the inorganic particles substantially in surface contact in the closely packed or densely packed structure by the inorganic particles.

The drying may be performed in a drying chamber, and in this instance, the condition of the drying chamber is not particularly limited due to nonsolvent coating.

However, in the case of the present disclosure, the drying is performed in a humid condition, and thus the polyvinylidene fluoride-based binder polymer may be mainly distributed on the surface of the porous coating layer.

The drying step may be performed at the relative humidity of 40% or above. For example, the drying step may be performed in the range of 35 to 65%.

Additionally, the drying step may be may be performed in the temperature range of 20 to 70° C. for 0.1 min to 2 min.

An aspect of the present disclosure provides a separator manufactured by the above-described manufacturing method.

An electrochemical device according to an aspect of the present disclosure includes a positive electrode (cathode), a negative electrode (anode), and a separator interposed between the positive electrode and the negative electrode, and the separator is the above-described separator according to an embodiment of the present disclosure.

The electrochemical device may include any type of device using electrochemical reactions, and for example, may include primary and secondary batteries, fuel cells, solar cells or capacitors such as super capacitors. In particular, among the secondary batteries, lithium secondary batteries including lithium metal secondary batteries, lithium ion secondary batteries, lithium polymer secondary batteries or lithium ion polymer secondary batteries are desirable.

The positive and negative electrodes to be used with the separator of the present disclosure are not limited to a particular type, and may be manufactured by binding an electrode active material to an electrode current collector by a common method known in the technical field pertaining to the present disclosure. Of the electrode active material, non-limiting examples of the positive electrode active material may include general positive electrode active materials commonly used in positive electrodes of electrochemical devices, and preferably include lithium manganese oxide, lithium cobalt oxide, lithium nickel oxide, lithium iron oxide or their lithium composite oxide. Non-limiting examples of the negative electrode active material may include general negative electrode active materials commonly used in negative electrodes of electrochemical devices, and preferably include lithium adsorption materials such as lithium metal or lithium alloy, carbon, petroleum coke, activated carbon, graphite or other carbons. Non-limiting examples of the positive electrode current collector may include a foil made from aluminum, nickel or a combination thereof, and non-limiting examples of the negative electrode current collector may include a foil made from copper, gold, nickel or copper alloy or a combination thereof.

An electrolyte solution, which may be used in the electrochemical device of the present disclosure, includes, but is not limited to, electrolyte solutions in which a salt is dissolved or dissociated in an organic solvent, the salt having a structure represented by, for example, $A^+B^-$, wherein $A^+$ is an alkali metal cation such as $Li^+$, $Na^+$, $K^+$ or a combination thereof, and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the organic solvent including propylene carbonate (PC), ethylene carbonate (EC), diethylcarbonate (DEC), dimethylcarbonate (DMC), dipropylcarbonate (DPC), dimethyl sulfoxide, acetonitrile, dimethoxyethane, diethoxyethane, tetrahydrofuran, N-methyl-2-pyrrolidone (NMP), ethylmethylcarbonate (EMC), γ-butyrolactone, or their mixtures.

The pouring of the electrolyte solution may be performed in any suitable step of a battery manufacturing process according to a manufacturing process and required properties of a final product. That is, the pouring of the electrolyte solution may be applied before battery assembly or in the final step of battery assembly.

Hereinafter, the present disclosure will be described in detail through examples. However, the examples of the present disclosure may be modified in many other forms, and the scope of the present disclosure should not be construed as being limited to the following examples. The examples of the present disclosure are provided to fully explain the present disclosure to those having ordinary knowledge in the art to which the present disclosure pertains.

Example 1

First, a polyvinylpyrrolidone binder polymer having the weight average molecular weight of 2,500,000 and the k-value of 120 is added to isopropanol as a first organic solvent, and dissolved at 50° C. for about 4 hours to prepare a first binder composition.

Subsequently, cyanoethylpolyvinylalcohol as a dispersant, and polyvinylidene fluoride-co-hexafluoropropylene and polyvinylidene fluoride-co-chlorotrifluoroethylene as a polyvinylidene fluoride binder polymer are added to acetone as a second organic solvent and dissolved at 50° C. for about 4 hours to prepare a second binder composition.

Subsequently, the first binder composition and the second binder composition are mixed together, alumina ($Al_2O_3$) inorganic particles (Alteo, P172LSB, particle size: 500 nm) and boehmite inorganic particles are added to the mixture at a ratio of 85:15, and the inorganic particles are pulverized and dispersed for 2 hours using a bead milling method to prepare a porous coating layer slurry. In this instance, the composition of the porous coating layer slurry is controlled as shown in Table 1.

A separator having a porous coating layer is manufactured by coating the porous coating layer slurry on two surfaces of a 9 μm thick polyethylene porous polymer substrate (Toray, porosity: 45%) in a loading amount of 13.5 g/m₂ by the dip coating method at 23° C. and the relative humidity of 40% and drying to form the porous coating layer.

Examples 2 to 5

A separator is manufactured by the same method as example 1 except that the composition of the porous coating layer slurry is controlled as shown in Table 1.

Comparative Examples 1 to 4

A separator is manufactured by the same method as example 1 except that the composition of the porous coating layer slurry is controlled as shown in Table 1.

TABLE 1

| Classification | | Comparative example 1 | Example 2 | Example 3 | Example 4 | Comparative example 2 | Example 1 | Comparative example 3 | Example 5 | Comparative example 4 |
|---|---|---|---|---|---|---|---|---|---|---|
| Inorganic particles (Alumina:Boehmite = 85:15) (based on 100 parts by weight of inorganic particles, binder polymer and dispersant) | | 78 | 78 | 78 | 78 | 78 | 78 | 78 | 78 | 78 |
| Polyvinylpyrrolid one (based on 100 parts by weight of inorganic particles, binder polymer and dispersant) | | 0 | 2.5 | 3 | 5 | 5 | 5 | 5 | 10 | 12 |
| Polyvinylidene fluoride-based binder polymer | PVDF-HFP | 15.5 | 13.56 | 13.18 | 11.63 | 11.63 | 11.63 | 11.63 | 7.75 | 6.2 |
| | PVDF-CTFE | 4.5 | 3.94 | 3.83 | 3.38 | 3.38 | 3.38 | 3.38 | 2.25 | 1.8 |
| Dispersant | Cyanoethylpoly-vinylalcohol | 2 | 2 | 2 | 2 | 2 | 2 | 2 | 2 | 2 |
| Isopropanol:Acetone (weight ratio) | | 0:100 | 18:82 | 18:82 | 8:92 | 3:97 | 18:82 | 32:68 | 18:82 | 18:82 |
| Thickness (μm) | | 18 | 18 | 18 | 18 | — | 18 | 18 | 18 | 18 |
| Air permeability (s/100 cc) | | 1600 | 220 | 250 | 310 | — | 380 | 420 | 1010 | 3520 |
| Resistance (ohm) | | 1.03 | 0.76 | 0.79 | 0.50 | — | 0.66 | 0.74 | 0.90 | 1.44 |
| Lami Strength (gf/25 mm) | | 60 | 65 | 70 | 33 | — | 66 | 10 | 15 | 5 |
| Thermal shrinkage (150° C., 30 m) | MD | 20 | 24 | 19 | 17 | — | 17 | 15 | 4 | 3 |
| | TD | 18 | 18 | 17 | 15 | — | 13 | 12 | 3 | 2 |

TABLE 1-continued

| Classification | Comparative example 1 | Example 2 | Example 3 | Example 4 | Comparative example 2 | Example 1 | Comparative example 3 | Example 5 | Comparative example 4 |
|---|---|---|---|---|---|---|---|---|---|
| Remarks | Poor air permeability Poor resistance | | | | Impossible to form a porous coating layer | | Poor Lami Strength | | Poor Lami Strength Poor resistance |

Evaluation Results

The details of the evaluation method are as below.

1) Thickness Measurement Method

The thickness of the separator is measured using a thickness measurement instrument (Mitutoyo, VL-50S-B).

2) Air Permeability Measurement Method

In accordance with JIS P-8117, air permeability is measured using a Gurley type air permeability tester. In this instance, the time taken for air of 100 cc to pass through the separator having the diameter of 28.6 mm and the area of 645 mm² is measured.

3) Resistance Measurement

A resistance value when the separators manufactured in examples 1 to 5 and comparative examples 1 to 4 are immersed in the electrolyte solution, is measured by the alternating current method at 25° C. using a 1M $LiPF_6$-ethylene carbonate/ethylmethyl carbonate (Weight ratio 3:7) electrolyte solution.

4) Separator-Negative Electrode Lami Strength (Gf/25 mm) Measurement

To measure the Lami Strength with the negative electrode, the electrode is manufactured as below.

Artificial graphite as a negative electrode active material, carbon black as a conductive material, Carboxy Methyl Cellulose (CMC) as a dispersant and Styrene-Butadiene Rubber (SBR) as a binder are put into water at a weight ratio of 96:1:2:2 and mixed together to prepare a negative electrode slurry. The negative electrode slurry is coated in an amount of 3.55 mAh/g on a 50 μm thick copper foil (Cu-foil) as a negative electrode current collector into the shape of a thin polar plate, and dried at 135° C. for 3 hours or longer and pressed to manufacture a negative electrode.

The negative electrode manufactured as above is tailored to the size of 25 mm×100 mm. The separators manufactured in examples 1 to 5 and comparative examples 1 to 4 are tailored to the size of 25 mm×100 mm. The separator and the negative electrode prepared as above are laid over each other, interposed between 100 μm PET films, and adhered using a flat plate press. In this instance, the condition of the flat plate press is heated and pressed at 70° C. under the pressure of 600 kgf for 1 second. The separator and the negative electrode adhered to each other are attached to a slide glass using a double-sided tape. The end part of the adhesive surface (10 mm or less from the end of the adhesive surface) of the separator is peeled off and adhered such that the longitudinal direction is connected to a 25×100 mm PET film using a single sided tape.

Subsequently, a force is applied 1800 at 300 mm/min with the slide glass being placed on a lower holder of UTM instrument (LLOYD Instrument LF Plus) and the PET film adhered with the separator being placed on an upper holder of the UTM instrument, a force required to separate the negative electrode and the porous coating layer opposite the negative electrode is measured.

5) Thermal Shrinkage Measurement Method

The thermal shrinkage is calculated by (Initial length−Length after thermal shrink treatment at 150° C./for 30 min)/(Initial length)×100.

What is claimed is:

1. A method for manufacturing a separator for an electrochemical device, comprising:
   (S1) preparing a first binder composition comprising a polyvinylpyrrolidone binder polymer dissolved in a first organic solvent;
   (S2) separately preparing a second binder composition comprising a polyvinylidene fluoride-based binder polymer dissolved in a second organic solvent;
   (S3) preparing a porous coating layer slurry comprising inorganic particles dispersed in a mixture of the first binder composition and the second binder composition; and
   (S4) coating the porous coating layer slurry on at least one surface of a porous polymer substrate and drying the porous coating layer slurry to form a porous coating layer on the at least one surface of the porous polymer substrate,
   wherein a weight (A) of the polyvinylpyrrolidone binder polymer and a weight (B) of the polyvinylidene fluoride-based binder polymer satisfy a ratio of $A/B \leq 1$,
   wherein the polyvinylidene fluoride-based binder polymer is not soluble in the first organic solvent, and
   a weight ratio of the first organic solvent to the second organic solvent is 5:95 to 30:70.

2. The method for manufacturing the separator for the electrochemical device according to claim 1, wherein a boiling point of the first organic solvent is higher than a boiling point of the second organic solvent.

3. The method for manufacturing the separator for the electrochemical device according to claim 1, wherein a boiling point of the first organic solvent is 60° C. to 100° C.

4. The method for manufacturing the separator for the electrochemical device according to claim 1, wherein the first organic solvent comprises at least one of alcohol or water.

5. The method for manufacturing the separator for the electrochemical device according to claim 4, wherein the alcohol comprises at least one of ethanol, n-propanol, isopropanol, n-butanol, sec-butanol, isobutanol, or tert-butanol.

6. The method for manufacturing the separator for the electrochemical device according to claim 1, wherein the second organic solvent comprises at least one of acetone, tetrahydrofuran, methylenechloride, chloroform, or methylethylketone.

7. The method for manufacturing the separator for the electrochemical device according to claim 1, wherein the weight (A) of the polyvinylpyrrolidone binder polymer and the weight (B) of the polyvinylidene fluoride-based binder polymer satisfy the ratio of $0.1 \leq A/B \leq 1$.

8. The method for manufacturing the separator for the electrochemical device according to claim 1, wherein the weight ratio of the first organic solvent to the second organic solvent is 8:92 to 18:82.

9. The method for manufacturing the separator for an electrochemical device according to claim 1, wherein a weight ratio of the inorganic particles to a total amount of the binder polymer is 85:15 to 50:50.

10. The method for manufacturing the separator for the electrochemical device according to claim 1, wherein the polyvinylidene fluoride-based binder polymer comprises at least one of polyvinylidene fluoride, polyvinylidene fluoride-co-hexafluoropropylene, polyvinylidene fluoride-co-trifluoroethylene, polyvinylidene fluoride-co-chlorotrifluoroethylene, or polyvinylidene fluoride-co-tetrafluoroethylene.

11. The method for manufacturing the separator for the electrochemical device according to claim 1, wherein the drying is performed in a relative humidity condition of 35% to 65%.

12. The method for manufacturing the separator for the electrochemical device according to claim 1, wherein a weight average molecular weight of the polyvinylpyrrolidone binder polymer is 675,000 to 3,500,000.

13. The method for manufacturing the separator for the electrochemical device according to claim 1, wherein the first binder composition or the second binder composition further comprises a dispersant.

14. The method for manufacturing a separator for the electrochemical device according to claim 13, wherein the dispersant comprises at least one of cyanoethylpolyvinylalcohol, polyvinyl butyral, polyvinyl alcohol, polyvinyl acetate, polyethylene oxide, polyarylate, cellulose acetate, cellulose acetate butyrate, cellulose acetate propionate, cyanoethylpullulan, cyanoethylcellulose, cyanoethylsucrose, pullulan, or carboxyl methyl cellulose.

15. The method for manufacturing the separator for the electrochemical device according to claim 1, wherein a boiling point of the first organic solvent is higher by 20° C. to 45° C. than a boiling point of the second organic solvent.

16. The method for manufacturing the separator for the electrochemical device according to claim 1,
wherein the first organic solvent is a good solvent for the polyvinylpyrrolidone binder polymer, and a nonsolvent for the polyvinylidene fluoride-based binder polymer being capable of dissolving less than 5 wt % of the polyvinylidene fluoride-based binder polymer in the condition of 25° C., and
wherein the second organic solvent is a good solvent for the polyvinylidene fluoride-based binder polymer being capable of dissolving 10 wt % or more of the polyvinylidene fluoride-based binder polymer in the condition of 25C.

17. The method for manufacturing the separator for the electrochemical device according to claim 1, wherein the polyvinylpyrrolidone binder polymer has a K-value between 90 to 120.

* * * * *